Sept. 27, 1960  A. T. COURT  2,953,961
REAR VISION MEANS
Filed Feb. 1, 1957

INVENTOR.
Andrew T. Court
BY
R. T. Barnard
ATTORNEY

United States Patent Office 2,953,961
Patented Sept. 27, 1960

2,953,961

REAR VISION MEANS

Andrew T. Court, Detroit, Mich., assignor to General Motors Corporation, Detroit, Mich., a corporation of Delaware Filed Feb. 1, 1957, Ser. No. 637,825

1 Claim. (Cl. 88—1)

The present invention is a continuation-in-part of my copending application Serial Number 319,048, filed November 6, 1952, now abandoned, and relates to a rear vision system for automotive vehicles and, more particularly, to rear windows for improving the vehicle operator's view of the road behind the vehicle while eliminating the undesirable obstruction to forward vision through the front windshield presented by present rear view mirror arrangements in which the latter extends within the area of the front windshield.

The present trend in automotive engineering is toward increasing visibility for the operator and occupants of a vehicle. This has resulted in windshield glass areas becoming of ever increasing proportions. Furthermore, in past years, there has been a steady trend toward vehicle streamlining and, particularly, for decreasing the overall height of the vehicle. As these trends have progressed, a problem has been presented by the fact that a rear view mirror must necessarily project into the viewable area of the vehicle front windshield if the vehicle operator is to obtain a view through the rear window sufficiently far enough down the road. So positioning a rear view mirror has resulted in an undesirable obstruction to the vehicle operator's forward line of vision through the front windshield.

This condition has been sought to be corrected by placing the rear view mirror on or about the dashboard adjacent the lower edge of the front windshield so as to still enable the operator to receive an image far enough down the road to the rear of the vehicle. However, such positioning of the rear view mirror is wholly objectionable by reason of the fact that the vehicle occupants cut off the line of rear sight.

Since the centers of the front windshield and of the rear window lie in substantially the same general horizontal plane as the operator's eyes, the placing of the mirror above the windshield causes the line of rear vision to be inclined to a marked degree from the horizontal or from parallelism with the road. This results in the field of vision being restricted to a relatively small area of the road immediately behind the vehicle.

Therefore, it is desirable to have a rear vision system in which substantially horizontal light rays, or those parallel to the road, may pass through the rear window of a vehicle and be refracted upwardly to the rear view mirror, the latter being placed above the top edge of the vehicle front windshield so as to avoid any obstruction to the forward line of sight of the vehicle operator.

In years past, it has been suggested to accomplish this result by utilizing a rear window which, in effect, is a large prism of triangular shape in cross section. Such prisms are to be mounted vertically in the rear of the vehicle passenger compartment so as to refract light rays upwardly to a rear view mirror positioned above the front windshield. Such a window cannot be employed effectively in modern vehicles because it is inordinately large or thick at the upper edge thereof where it is secured to the vehicle.

Another form of a rear window intended to accomplish the aforedescribed purpose consists of a cup-shaped lens which has its thinnest portion at the center and the thickest portions at the outer edges thereof. Again, such a rear window lens cannot be used in present day vehicles because it is inordinately thick at its extremities.

It is, therefore, a primary object of this invention to provide a rear vision means which includes a rear window which will refract light rays travelling parallel to the road upwardly to a rear view mirror positioned out of the area of the front windshield and preferably at the top edge of the latter. Moreover, the rear window of this invention is so designed as to be relatively thin compared to prior art devices so that it may be utilized with present day vehicles.

It is a further object of this invention to provide a rear vision means of the type aforementioned which will permit the rear view mirror of a vehicle to be mounted at a sufficient elevation inside of the vehicle so as to cause the vehicle operator's rearward line of sight to be substantially over or past the heads and shoulders of other occupants of the vehicle.

It is further contemplated to provide a rear vision means of the type described comprising an upwardly and forwardly curved rear window which includes a plurality of vertically spaced horizontally extending bands of offset prismatic lenses, with each lens band being so related to the others as to variably refract light to a rear view mirror to form a substantially uninterrupted image, the resulting window having a thickness which is feasible for use with vehicles of modern design.

Within the scope of this invention, a vehicle rear window of the type aforementioned is formed with the offset prismatic lens bands formed on the outside surface thereof in order to eliminate a re-entrant angle in the glass and, at the same time, avoid lines of darkness across the image.

Furthermore, such a window may further include a negative cylindrical lens band positioned beneath the series of vertically spaced prismatic bands so as to enable a vehicle operator of less than average height to view the road directly behind the vehicle when he turns to look directly through the rear window. This cylindrical lens band will also permit the operator of a vehicle following the vehicle equipped with such a window to be able to look through the passenger compartment of the latter vehicle, which would not be possible with the aforedescribed prior art constructions.

It is another feature of this invention to provide a negative cylindrical rear window lens having a horizontal axis and which includes inner and outer smooth surfaces which variably diverge from near the lower portion thereof to the upper portion, while the entire window is inclined forwardly and upwardly. The inclination of the window adds to the optic refractive characteristics of the divergent lens surfaces so that the degree of refraction of light rays as they pass through the window progressively increases from the bottom to the top of the window, thereby reducing the extreme thickness of the window at its top edge.

It is a further object of this invention to so form the upwardly and forwardly curved window so that the smooth inner and outer surfaces thereof are substantially parallel at the lower portion of the window, but variably diverge throughout the vertical height of the window, thereby enabling a person of less than average height to look directly through the lower portion of the rear window and still obtain an image of the road directly behind the vehicle. Again, in this embodiment, the lower portion of the window permits the operator of a trailing vehicle to look through the passenger compartment of the preceding vehicle equipped with such a window.

Because of the fact that a negative cylindrical lens window of the type aforedescribed having smooth inner and outer diverging surfaces will usually distort or foreshorten the image transmitted therethrough, it is further contemplated within the scope of this invention to provide an optically positive rear view mirror to correct for the distortion in the image refracted through the rear window lens.

These and other objects, features and advantages of this invention will become more readily apparent as the description of the invention proceeds and in which reference is made to the following drawings in which.

Figure 1:
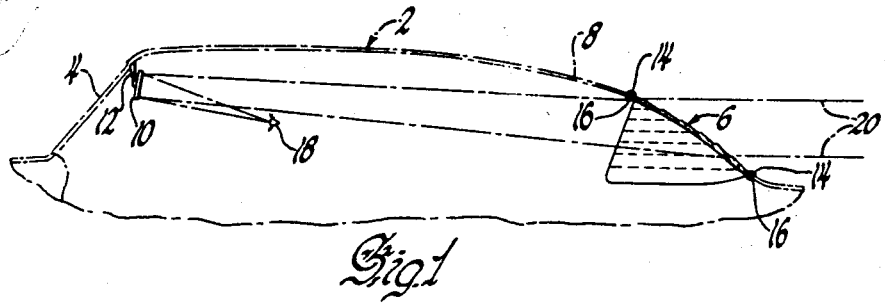
Figure 1 is a side sectional elevational view of an automobile body equipped with a preferred form of this invention.

Referring to the drawings in more detail, an automobile 2 is represented as having a front windshield 4 and a rear window 6 mounted in the body portion 8 thereof. To facilitate viewing the area of the road (not shown) behind the vehicle, a mirror 10 is provided which is swingably mounted upon a bracket 12. In the present instance, the bracket 12 is secured to the body of the vehicle immediately above the windshield 4 and projects rearwardly and downwardly from the top portion of said body. It is to be understood that although the mirror in the embodiment shown is preferably disposed above the windshield, certain advantages of this invention may also be obtained where the mirror is installed below the front windshield, particularly the fact that the mirror may be disposed out of the viewing area of the front windshield so as not to obstruct forward vision therethrough. The rear window 6 is mounted in the rear portion of the vehicle body 8 and is held in position by any suitable means, such as by a rubber gasket 14. The gasket 14 may be channelled around the inner and outer edges thereof to receive, respectively, a flange extending around the window 6 and the edge of the window opening in the vehicle body. The position of the viewing eye of an operator of average height is indicated at 18, the dotted lines 20 depicting his line of rear vision.

Figure 2:
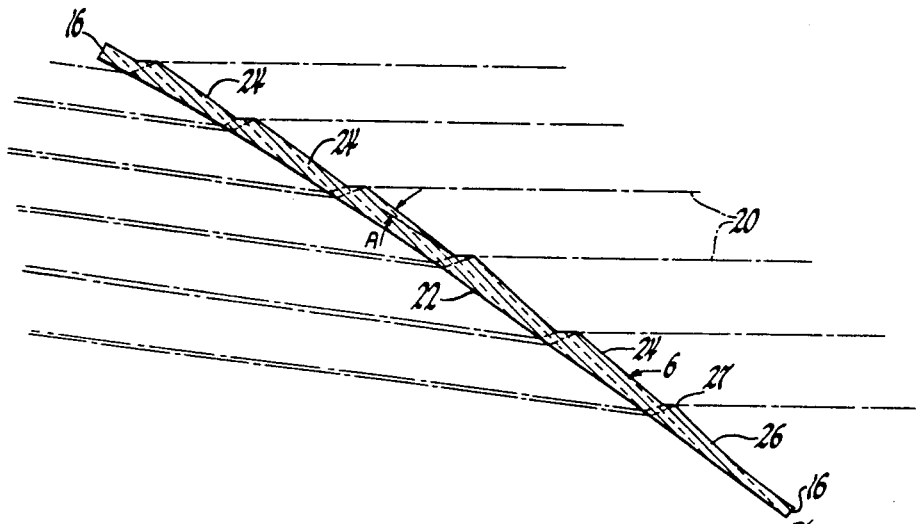
Figure 2 is an enlarged view of the rear window of Figure 1.

An enlarged view of the preferred form of the rear window may be seen by referring to Fig. 2. In this construction, the interior surface 22 and the general plane of the window are smooth and are curved forwardly and upwardly from its bottom to its top portion. The window is mounted on the vehicle by means of the rubber gasket 14 which receives the window flange 16, as previously described. To bend the rays of light 20 upwardly the desired amount, the outer surface of the window is provided with a plurality of offset refracting portions or bands 24 extending transversely across the window.

Each refracting portion 24 is wedge-shaped having the greatest cross sectional width at the upper end thereof and gradually tapering toward the lower end, thus forming a series of substantially horizontally extending vertically spaced optical elements that function as prisms. These prisms are each formed relative to each other, to the curvature of the window and to the refractive characteristics of the particular window material used so as to provide a substantially uninterrupted image to be viewed through the rear view mirror. One way in which this result may be accomplished is to so form the prismatic bands 24 so that their respective angles of taper or divergence "A" from the window progressively decrease from the lower bands to the upper bands. Thus, in constructing a rear window substantially to the curvature as shown, the rear window being made of material with an index of refraction of 1.55, the angle of divergence "A" of the outer surfaces of the prisms from the general plane of the window would progressively decrease from approximately 5.7 degrees on the lowermost band to approximately 4.1 degrees in the upper band. Such a construction will function to raise the line of rear horizontal vision approximately nine inches at a rear view mirror which is 72 inches away. Of particular significance is the fact that the offset prismatic bands are formed on the outside surface of the window in order to eliminate a re-entrant angle in the glass and, at the same time, avoid lines of darkness across the image; that is, the prismatic bands are so related to the window structure as aforedescribed so that the lines of sight on each side of the offset prismatic bands converge to form a substantially uninterrupted image at the eye, and one in which all lines of darkness have been eliminated.

As aforedescribed, this window construction will provide a substantially uninterrupted image visible through a rear view mirror. However, a person of substantially less than average height who turns around within the vehicle to look directly through such a rear window may not be able to view the area directly behind the vehicle if the rear window is made entirely of such aforedescribed prismatic lens bands 24. Thus, to make the rear window completely versatile, it may be desirable to incorporate therein a lower negative cylindrical lens band 26 having its thickest portion at the upper edge thereof to provide a condensed view of the road close to the car for such a person. It will be noted that the upper portion 27 of the lower cylindrical lens band is offset from the general plane of the window similar to the offset prismatic lens bands 24. Moreover, at its upper edge 27, the cylindrical lens band 26 functions as a prism to cooperate with the prismatic lens bands 24 to form the image aforementioned. By way of example, and referring to the exemplary structure aforedescribed, the angle of taper or divergence "A" of the tangent to the outer surface of the condensing cylindrical lens 26 at 27 would be approximately 5.8 degrees.

While the incorporation of a lower negative cylindrical lens band 26 into such a window is desirable for the reason aforementioned, it has an additional advantage of enabling the operator of a vehicle following a vehicle equipped with such a window to look directly through the window so as to view traffic conditions in front of such a vehicle. Without such a lens band 26, the operator of a trailing vehicle would not have such a view.

Although not necessary, it may be desirable to employ a rear view mirror to correct for any chromatic aberration in the window of Fig. 2. Such a mirror is one having two reflecting surfaces with the rearmost one being silvered; that is, a mirror similar to an anti-glare rear view mirror having a prismatic lens. Naturally, the angle between the silvered and unsilvered surfaces of the prism would be less than in a typical anti-glare rear view mirror and will depend on the particular rear window arrangement employed.

Figure 3:
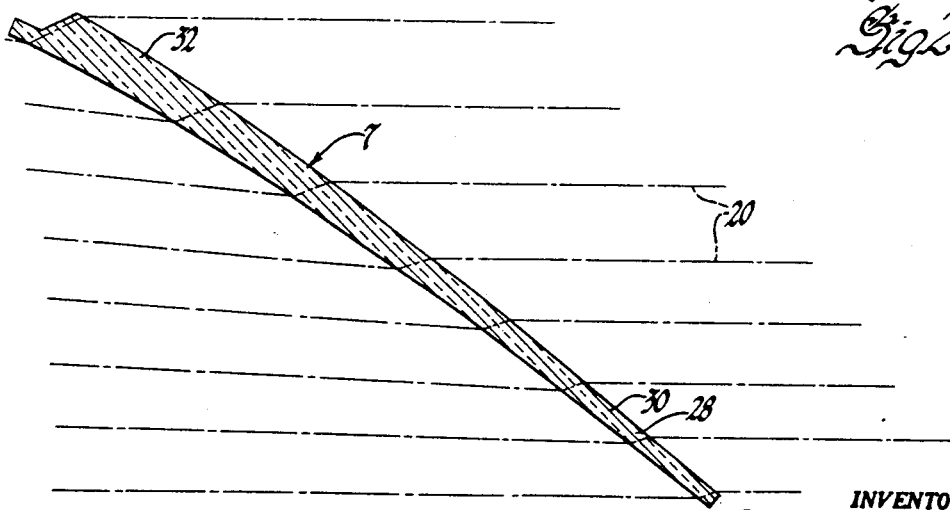
Figure 3 is another form of a rear window which may be utilized in the rear view system of this invention.

Figure 3 discloses a further modification of the present invention utilizing a negative cylindrical lens wherein the lower portion 28 of the window 7 is of substantially uniform thickness. However, at about the point 30, the smooth inner and outer surfaces of the window variably diverge toward the top portion 32 of the window, the window being inclined as in the previous embodiment. It will be apparent that due to the inclination of the window above the point 30, the degree of defractive power of the window will progressively increase from the point 30 to the top edge of the window. In other words, inclining the window 7, as shown, provides a lens with greater refractive power for light rays entering parallel to the road than if the same window were to be positioned vertically.

In a window constructed substantially to the scale shown in Fig. 3, the light rays 20 passing therethrough parallel to the road will diverge as they are refracted upwardly to raise the line of rear horizontal vision nine inches at the rear view mirror. To accomplish this result with the particular window shown by way of example, the lowermost light ray 20 is refracted through the window but still travels parallel to the horizontal through the passenger compartment, while the remaining seven light rays depicted are refracted upwardly from one to seven degrees, respectively, from the horizontal throughout the vertical height of the window.

Thus, the rear window of this embodiment may be seen to include a series of vertically spaced variably refractive lens bands which transmit an uninterrupted image, although the lens bands of this embodiment gently merge throughout the height of the rear window as compared with the offset bands 24 of the rear window shown in Fig. 2. In view of the fact that the surfaces of the lower portion 28 of the window below the point 30 are substantially parallel, the extremely short person will be able to turn and look directly through the window and still be able to see the area directly behind the vehicle. Moreover, the operator of a trailing vehicle will be able to see through the lower portion of such a window as aforedescribed.

Where a negative cylindrical lens is employed as shown in Fig. 3, it is desirable to employ some means in the rear vision system to correct for the distorted image which passes therethrough. In the specific window as shown in Fig. 3 and as viewed by an ordinary rear view mirror, the vertical height of the image viewed would appear foreshortened. Thus, a rear view mirror 10 having a sign opposite to that of the negative cylindrical lens, that is, to enlarge images, may be utilized to correct for this foreshortening. Such a mirror is one of concave curvature about a horizontal axis with the concave surface being viewed by the vehicle operator.

Thus, it may be seen that the two rear windows disclosed are forwardly and upwardly inclined and have a series of vertically spaced variably refractive lens bands which are so related to each other as to provide a substantially uninterrupted image to the vehicle operator. It will also be seen that by utilizing the rear vision means disclosed, the rear view mirror may be placed out of the line of forward sight of the vehicle operator, while still enabling him to obtain an image of the road behind the vehicle. As such, the present invention is a marked improvement over the prior art constructions by reason of the fact that they may be easily and conveniently employed with present day automobile designs because of their being little if any thicker than a conventional rear window.

While the embodiments herein disclosed constitute preferred forms of the invention, it will be apparent that this invention may be employed in numerous other specific forms without departing from the true spirit thereof. In this respect, it should be noted that the rear window may be dished or curved inwardly toward the passenger compartment rather than outwardly as shown, it only being necessary to relate the spaced lens bands to each other as taught by this invention to form a viewable image for the vehicle operator. It is to be understood, therefore, that this invention is not to be limited by any of the embodiments shown, but only by the scope of the claim appended hereto.

I claim:

A window positioned in the rear of a vehicle passenger compartment, said window being curved forwardly and upwardly throughout its vertical height, a plurality of vertically spaced horizontally extending wedge-shaped refracting lens bands offset from the exterior surface of said window, said bands having the greatest cross sectional width at the upper end thereof and gradually tapering toward the lower end, the angles of offset of said bands progressively decreasing throughout the height of said window, the total decrease being approximately one and one-half degrees whereby light rays entering said window parallel to the road are refracted upwardly through said compartment to converge toward a mirror, and a horizontally extending negative cylindrical lens band having a horizontal axis spaced below the lowermost portion of said refracting lens bands, the upper portion of said cylindrical lens band functioning to refract a portion of said light rays.

References Cited in the file of this patent

UNITED STATES PATENTS

| | | |
|---|---|---|
| 1,622,933 | Webber | Mar. 29, 1927 |
| 1,907,800 | Harrington | May 9, 1933 |
| 2,135,262 | Schumacher | Nov. 1, 1938 |
| 2,338,488 | Brown | Jan. 4, 1944 |
| 2,484,136 | Wells | Oct. 11, 1949 |
| 2,622,482 | Balkin | Dec. 23, 1952 |
| 2,679,179 | Falge et al. | May 25, 1954 |
| 2,769,373 | Bouwers | Nov. 6, 1956 |

FOREIGN PATENTS

| | | |
|---|---|---|
| 639,277 | France | Mar. 6, 1928 |
| 790,905 | France | Sept. 16, 1935 |